United States Patent
Theobald

(10) Patent No.: US 9,506,481 B1
(45) Date of Patent: Nov. 29, 2016

(54) HIGH FORCE HYDRAULIC ACTUATOR

(71) Applicant: Daniel Theobald, Sommerville, MA (US)

(72) Inventor: Daniel Theobald, Sommerville, MA (US)

( * ) Notice: Subject to any disclaimer, the term of this patent is extended or adjusted under 35 U.S.C. 154(b) by 647 days.

(21) Appl. No.: 13/755,316

(22) Filed: Jan. 31, 2013

(51) Int. Cl.
- *F15B 15/20* (2006.01)
- *F15B 15/10* (2006.01)
- *B25J 9/14* (2006.01)

(52) U.S. Cl.
CPC ............. *F15B 15/20* (2013.01); *B25J 9/142* (2013.01); *F15B 15/103* (2013.01)

(58) Field of Classification Search
CPC ........ F15B 15/103; F15B 15/20; B25J 9/142
USPC ............................................................ 92/90
See application file for complete search history.

(56) References Cited

U.S. PATENT DOCUMENTS

| | | | |
|---|---|---|---|
| 3,830,519 A * | 8/1974 | Lewis | 280/733 |
| 4,739,692 A * | 4/1988 | Wassam et al. | 91/36 |
| 4,819,547 A * | 4/1989 | Kukolj | 92/261 |
| 5,040,626 A | 8/1991 | Paynter | |
| 5,080,000 A | 1/1992 | Bubic | |
| 5,351,602 A | 10/1994 | Monroe | |
| 5,529,293 A | 6/1996 | Haugs | |
| 6,168,634 B1 * | 1/2001 | Schmitz | 414/4 |
| 6,223,648 B1 * | 5/2001 | Erickson | 92/92 |
| 6,666,127 B2 * | 12/2003 | Peles | 92/50 |
| 6,868,773 B2 * | 3/2005 | Davis et al. | 92/92 |
| 7,104,182 B2 | 9/2006 | Reininger | |
| 7,331,273 B2 | 2/2008 | Kerekes | |
| 7,607,380 B2 * | 10/2009 | Hiramatsu et al. | 91/1 |
| 7,837,144 B2 | 11/2010 | Kothera | |
| 8,185,243 B2 * | 5/2012 | Okazaki | 700/260 |
| 2002/0157322 A1 | 10/2002 | Pedretti | |
| 2002/0157388 A1 | 10/2002 | Seto et al. | |
| 2009/0173223 A1 | 7/2009 | Kudawara | |
| 2010/0269689 A1 * | 10/2010 | Nakamura et al. | 92/92 |
| 2011/0023474 A1 | 2/2011 | Kudawara | |

* cited by examiner

*Primary Examiner* — Thomas E Lazo
(74) *Attorney, Agent, or Firm* — Albert J. Brunett

(57) ABSTRACT

An actuator has a plurality of artificial muscle style hydraulic actuator elements forming a bundle with a bundle force density. Each artificial muscle style hydraulic actuator element has a first diameter. The bundle force density is at least two times greater than the force density of any single one of the artificial muscle style hydraulic elements if that single one artificial muscle style hydraulic actuator element had a second diameter. In illustrative embodiments, the second diameter is at least five times greater than the first diameter.

2 Claims, 3 Drawing Sheets

| Property | Human Muscle | Hydraulics |
|---|---|---|
| Max. Strain ($L/L_0$) | 30-70% | 10-100% |
| Max. Stress (MPa) | .1-.4 | 20-70 |
| Power Density (W/m$^3$) | $5 \times 10^5$ | $5 \times 10^8$ |
| Density (kg/m$^3$) | 1000-1100 | 1600-2000 |
| Efficiency | 20-25% | 90-98% |
| Activation Frequency ($s^{-1}$) | 5 - 500 | 5 - 300 |
| Control Resolution | $10^{-1}$-$10^{-2}$ | $10^{-5}$-$10^{-4}$ |

HIGH FORCE HYDRAULIC ACTUATOR

PRIORITY

This patent application is a continuation-in-part of U.S. patent application Ser. No. 13/625,200 entitled, "HYDRAULIC ACTUATOR," filed on Sep. 24, 2012 the disclosure of which is incorporated herein, in its entirety, by reference.

FIELD OF THE INVENTION

The present invention relates generally to actuators and, in at least one embodiment, to such actuators that are hydraulic or fluid powered and/or used as an artificial or "mechanical" muscle.

BACKGROUND OF THE INVENTION

Actuators typically are mechanical devices that are used for moving or controlling a mechanism, system or the like and typically convert energy into some type of motion. Examples of actuators can be found in any number of applications encountered in everyday life including automotive, aviation, construction, farming, factories, robots, health care and prosthetics, among other areas.

Mobile robotics and advanced prosthetics will likely play important roles in the future of the human race. Actuators frequently are used in these applications that enable movement of a robot or user arm or other appendage or item as desired.

Most existing mobile robots and advanced prosthetics, however, lack the strength and speed necessary to be effective. This is because they suffer from poor specific power (strength×speed/weight) which determines how quickly work can be done compared to another actuator of the same weight.

For example, if such devices are capable of lifting significant weight, they must do so very slowly, which inhibits their adoption for most applications. On the other hand, devices that can move more quickly are just not capable of handling anything more than the smallest weight.

Hydraulic and pneumatic power systems can be used with such actuators, among other power systems. Pneumatic power systems, however, have a relatively low operating pressure, which limits the amount of force they can impart and exhibit poor controllability due to the compressible nature of air, among other drawbacks.

Additionally, conventional hydraulics technology suffers from poor efficiency, noisy operation, high cost and maintenance challenges among other problems. These and other problems inhibit the use of hydraulics in many applications.

SUMMARY OF THE INVENTION

In accordance with one embodiment of the invention, an actuator has a plurality of artificial muscle style hydraulic actuator elements forming a bundle that enables a bundle force density. Each artificial muscle style hydraulic actuator element has a first diameter. The bundle force density is at least two times greater than the force density enabled by any single one of the artificial muscle style hydraulic elements if that single one artificial muscle style hydraulic actuator element had a second diameter. In illustrative embodiments, the second diameter is at least five times greater than the first diameter.

BRIEF DESCRIPTION OF THE DRAWINGS

The following detailed description will be better understood when read in conjunction with the appended drawings in which there is shown one or more of the multiple embodiments of the present disclosure. It should be understood, however, that the various embodiments of the present disclosure are not limited to the precise arrangements and instrumentalities shown in the drawings.

FIG. 4 is a partial cross-sectional view of one embodiment of the present invention illustrating a plurality of activation elements enclosed in an outer sheath member or the like;

DETAILED DESCRIPTION OF THE INVENTION

Figure 1:
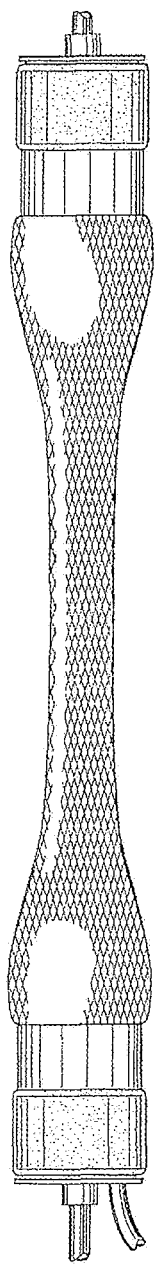
FIG. 1 is a plan view of one embodiment of an activation element of the present invention that may be utilized with the actuator of the present invention illustrated in a first "at rest" position.

Various embodiments of the present invention are described below with reference to the accompanying drawings. It should be understood that the following description is intended to describe exemplary embodiments of the invention, and not to limit the invention.

It is understood that the present invention is not limited to the particular components, analysis techniques, etc. described herein, as these may vary. It is also to be understood that the terminology used herein is used for the purpose of describing particular embodiments only, and is not intended to limit the scope of the present invention. It must be noted that as used herein, the singular forms "a," "an," and "the" include plural reference unless the context clearly dictates otherwise. The invention described herein is intended to describe one or more preferred embodiments for implementing the invention shown and described in the accompanying figures.

Unless defined otherwise, all technical and scientific terms used herein have the same meanings as commonly understood by one of ordinary skill in the art to which this invention belongs. Preferred methods, system components, and materials are described, although any methods and materials similar or equivalent to those described herein can be used in the practice or testing of the present invention.

Many modifications and variations may be made in the techniques and structures described and illustrated herein without departing from the spirit and scope of the present invention. Accordingly, the techniques and structures described and illustrated herein should be understood to be illustrative only and not limiting upon the scope of the present invention. The scope of the present invention is defined by the claims, which includes known equivalents and unforeseeable equivalents at the time of filing of this application Various embodiments of the present invention are directed to various devices that are fluid powered, such as by hydraulics or pneumatics, for example. It is to be understood, however, that some embodiments of the present invention are not limited to these two specific technologies.

In operating a robot, advanced prosthetic, or some other item or mechanism, some type of power system typically is provided to enable particular movement, such as moving an arm or other appendage, for example. As readily can be discerned, in order to provide at least up and down movement to an arm member or the like some type of mechanical or other actuator typically is employed.

In a simple example, a piston driven actuator may be implemented to accomplish this movement. By moving the piston back and forth within a cylinder, the piston rod provides the basic movement to the arm member connected at is distal end.

Another type of actuator can be one that mimics the motion of a real biological muscle in the body of a human or other animal. These artificial or mechanical muscles typically provide some type of expandable member or tube connected at one end to an arm member, such as a forearm of a robot, for example, and at the other end to another member such as the upper arm or shoulder of a robot, for example.

Briefly, in operation, when such a member is expanded in a direction substantially perpendicular to its longitudinal centerline, it essentially contracts the member thereby drawing the arm closer to the shoulder. When the member is thereafter allowed to expand in a direction substantially parallel to its longitudinal centerline, it essentially extends the member and the arm moves away from the shoulder.

One example of such a mechanical muscle is known as a McKibbons style actuator, which is hereby incorporated by reference. It is to be understood, however, that the particular type of mechanical muscle and corresponding expanding member can vary without departing from the teachings of various embodiments of the present invention.

These types of actuators or mechanical muscles exhibit a specific power (strength×speed/weight) that far exceeds that of existing actuators typically used in robots that suffer from poor efficiency, noisy operation, high cost and maintenance challenges, among other drawbacks. These drawbacks and more are readily solved by the design of illustrative embodiments of the present invention that readily exceed the performance of real biological muscles.

Additionally, as the human race begins to work in close collaboration with robots, advanced prosthetics, and similar machines and mechanisms, they are anticipated to expect the robots to be stronger, faster, have better endurance, be more precise, and cost less than other options. They also may expect robots to quickly and efficiently carry out their assigned physical tasks with little or no down time for maintenance or fatigue, for example.

Biological muscles consist of many smaller "actuator" fibers called sarcomeres, bundled in parallel. During movement of a body limb, for example, all or just a partial subset of available fibers may be activated depending on the task involved.

By scaling down the size of mechanical muscles, arranging them in bundles and designing them to handle much higher hydraulic pressures, a large increase in specific power is achieved. Significant reduction in the overall weight of this design, among other factors, leads to this increase in specific power. At the same time, by activating any number of the actuators arranged in such a bundle to vary the power output for the task at hand, significant power savings is achieved.

When employing these types of mechanical or artificial muscles, the trend is to provide a single actuator for each direction of desired motion. With this design, variations in movement and control are limited.

One key feature among many of illustrative embodiments is to provide a plurality of discrete, readily interchangeable mechanical muscles for each direction of desired motion, where each muscle has a predetermine power capability. This concept dramatically teaches away from conventional thinking, provides a number of distinct and unexpected results and advantages in the art, and essentially revolutionizes the potential applications possible.

As one example, by using a plurality or bundle of muscles, the number of muscles activated can vary depending on the power requirements of the task at hand. One advantage of this novel design concept is power conservation, which is particularly important with mobile robots as well with overall environmental concerns.

Another advantage is in the type and number of potential applications that become available by using a bundle of muscles. With conventional thinking being to merely increase the size of the actuator or muscle to increase the power capability of the device, applications are limited to larger and larger devices. In the design discussed herein, smaller and smaller applications are possible since the actuators can be smaller and lighter, among other attributes.

Examples of various hydraulic systems and robotic applications where a mechanical muscle may be employed can be found, for example, in applicant's issued U.S. Pat. No. 7,348,747 filed Mar. 30, 2006, issued U.S. Pat. No. 7,719,222 filed Mar. 24, 2008 and pending U.S. patent application Ser. No. 12/731,270 entitled "Task Flexibility for Actuators" filed Mar. 25, 2010 and related co-pending applications, all of the disclosures of which are hereby incorporated by reference. It is to be understood, however, that the particular details of the hydraulic system itself, as well as the robot, vehicle, tool, heavy equipment, actuator, or other apparatus, can vary without departing from the teachings of various embodiments of the invention.

Figure 2:
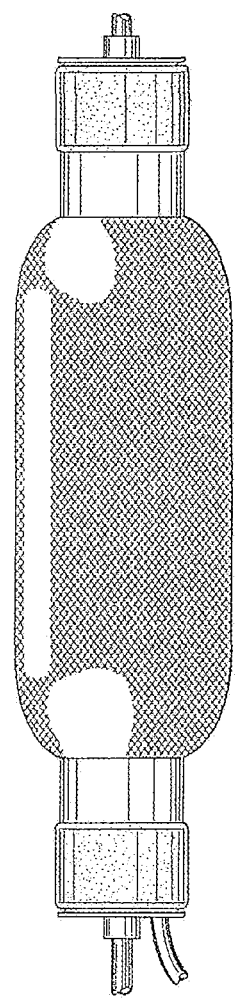
FIG. 2 is a plan view of the element of FIG. 1 illustrated in a second activated position.

FIGS. 1 and 2 generally illustrate one embodiment of a mechanical muscle 10 (i.e., an activation element) that may be employed in various embodiments of the present invention. The particular size, shape, material and design of the muscle 10 can vary so long as it falls within the scope of the appended claims.

Briefly, in operation, FIG. 1 generally illustrates the muscle 10 in an extended or at-rest position where no fluid is provided to the interior of the muscle 10. As FIG. 2 generally illustrates, when fluid is provided to the interior of the muscle 10, the muscle 10 expands in a direction substantially perpendicular to its longitudinal centerline, essentially contracting the muscle 10, thereby shortening it length. Conversely, when fluid is essentially released from the interior of the muscle 10, the muscle 10 expands in a direction substantially parallel to its longitudinal centerline, thereby increasing its length.

As readily can be discerned and described in more detail below, if the muscle 10 is attached on opposite ends to other members, desired movement between the members can be achieved. Additionally, the particular type, shape, material and design of the muscle 10 can be varied to in turn vary the movement between the two members to which it is attached.

Figure 3:
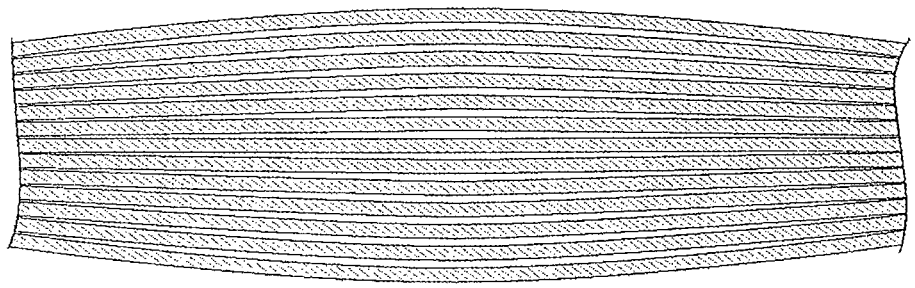
FIG. 3 is a partial plan view of one embodiment of the present invention illustrating a plurality of activation elements arranged in a bundle.
Figure 4:
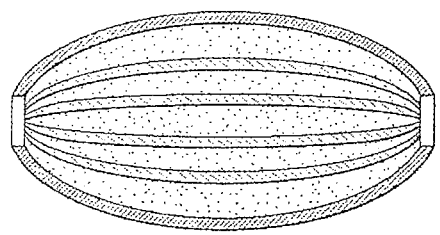
Figure 5:
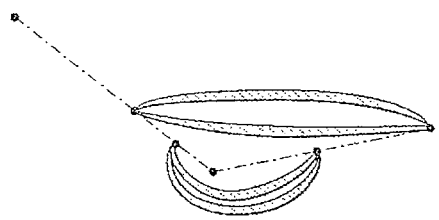
FIG. 5 is a semi-schematic view of one embodiment of the present invention illustrating one potential use of the activation elements.

As FIG. 3 generally illustrates, the number of muscles 10 utilized can be expanded to vary the performance of the muscle 10 as needed. In particular, by providing a number of muscles 10 in one or more bundles 12 a corresponding increase in the lifting or movement capacity of the muscle 10 or bundle 12 can be accomplished.

Existing actuators for robot, prosthetics, and the like are heavy and lack the specific power necessary for effective designs. This limits the number, strength, and speed of each degree of freedom in a robot or the like.

While the human body has over 600 individual skeletal muscles, the most advanced humanoid robots in existence today can afford only 50 or so conventional actuators and still end up weighing twice as much as a human, which can present a safety issue when working closely with humans. To be truly capable and safe, robots and prosthetics need to be stronger, weigh less, and have many more degrees of freedom than current systems.

Pneumatic actuators or mechanical muscles are limited by their relatively low operating pressure of about 100 PSI and poor controllability due to the compressible nature of air, which is generally the working fluid in such pneumatic systems. By utilizing a design incorporating hydraulically actuated actuators or mechanical muscles as described herein that are capable of operating at much higher pressures of about 3000 PSI, incredible increases in power are provided while increasing controllability.

As the goal of robotics aims to supplant human labor, human skeletal muscle is an appropriate standard to beat. Muscles provide adaptive, integrated closed-loop positional control; energy absorption and storage; and elastic strain to allow for deformation of tissue under loads. They are rapidly responsive and able to adjust spring and damping functions for stiffness and compliance in stability, braking, and more. A viable artificial actuation approach should at least provide such comprehensive functionality; additionally such an approach should meet or exceed the set of performance metrics of human muscles and improve upon muscles' limited peak performance envelope.

Figures 6, 7:
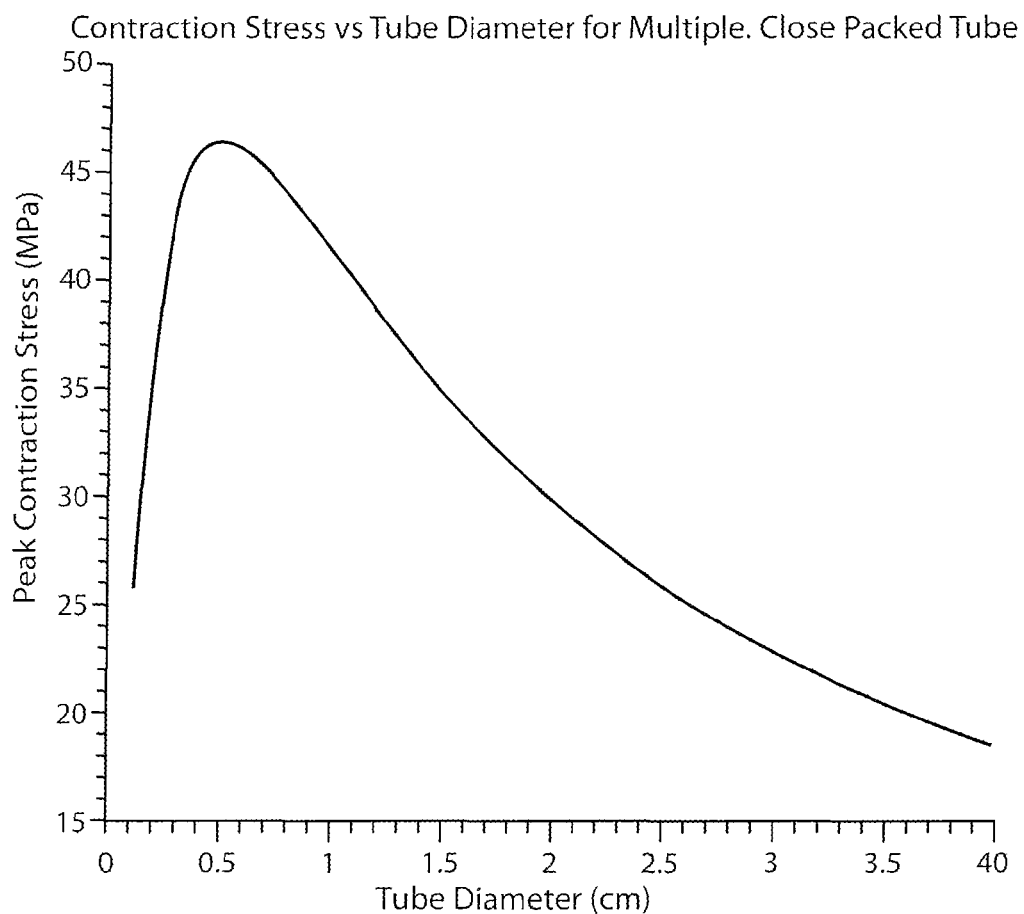
FIG. 6 is a table illustrating performance characteristics of human muscles and hydraulic systems.
FIG. 7 is a graph illustrating contraction stress vs. tube diameter.

As FIG. 6 illustrates, hydraulic mechanical muscles 10 outperform human muscle in power density, efficiency, stress vs. strain, frequency, control resolution, and will closely match human muscle in density, and variable compliance ability. In addition, hydraulic mechanical muscles will also achieve significant improvements in the state of the art in terms of cost, manufacturability, flexibility in application, and scalability. As described earlier, the power density factor is an important criterion that implies the simultaneous speed and strength needed for things like running and throwing.

While existing somewhat exotic actuator technologies may exceed any single actuator performance metric, they are unable to provide comparable overall performance. For example, piezoelectrics are unacceptably brittle; shape memory alloys (SMAs) have prohibitively slow response cycles due to a temperature-dependent actuation; magnetostrictors require constant, fragile magnetic fields at large scales.

Additionally, electroactive polymers (EAPs), require large and potentially unsafe actuation voltages (>1 kV, typical) and consistent current to maintain displacement, possibly making them unacceptably inefficient while chemically-activated ionic versions do not consistently sustain DC-induced displacement and have slow response times. Additionally, EAPs have difficulty damping for low frequency vibration and inaccurate position sensing capabilities due to inherent actuator flexibility. Since biological joints are analogous to direct-drive actuation and therefore largely backdrivable (i.e. resilient), the same forces acting upon an EAP actuator in a leg for example will cause it to deform and perform unexpectedly. Most of all, these materials are prohibitively expensive and complicated to manufacture.

More conventional existing actuators fail to replicate muscle-like performance for a number of reasons. Electromagnetic approaches lack any real scalability because of their need for expensive, high power, rare-earth magnets. Their highly specialized motor design precludes the force output properties of muscle tissue.

Out of all available actuation techniques, pneumatic actuators, particularly of the "mechanical muscle" or McKibbens type described above appear to most closely match the force-velocity and force-length characteristics of human muscle. These pneumatic actuators exploit the high power density, light weight, and simplicity of fluid power, but precise control of these systems is difficult because of the compressibility of air and the inherent excessive compliance, hysteresis, nonlinearity, and insufficient contraction rates of rubber actuators.

In contrast, a hydraulic approach to mechanical muscle fluid power avoids these limitations while at the same time offering inherent advantages for adjustable compliance, proportional force output, energy recovery and efficiency, precise control, and scalability. This broad complement of properties makes hydraulics an excellent candidate for biometric actuation.

In fact, the overall superior performance of hydraulics for vibration damping, actuation frequency, and volumetric power for compact designs in general applications are well known. Furthermore, since hydraulics operate on virtually the same principles as pneumatics, which perform comparably to natural muscle, they are similarly suitable for artificial muscles if used in the right actuator design. As such, a new paradigm in actuator approach is provided in at least one embodiment of the present invention that leverages the superior power and controllability of hydraulics with biophysical principles of movement.

One of the many significant benefits of a bundle of mechanical muscles approach is that simultaneous activation of all of the bundled actuators becomes unnecessary; rather, there is the potential to activate only the minimum of muscle fibers or actuators that are needed for the task. Benchtop tests demonstrated a 3 inch displacement for a strain of 70%. Maximum pulling force (before material failure) was approximately 95 pounds at a pressure of nearly 1800 PSI. This bundle approach to mechanical muscles will achieve at least 10 times the specific power of human muscle while achieving similar impedance control, and will be practical for use in robotic systems. As this type of system is perfected, additional increases in specific power are anticipated.

Human muscle is comprised of both pennate (fibers aligned at an angle to the muscle's long axis) and parallel-fibred muscles, each with functionally-specific mechanical features: pennate muscles act around joints, rotating their angle to act as variable gears, while parallel-fibered muscles are the workhorses (cf. biceps brachii or soleus) of load-bearing movement. The mechanical advantage of a bundle of small or miniature McKibbons type actuators is similar: since Pascal's Law holds that increases in fluid pressure are distributed equally to all parts of a system, force increases proportionally with the cross-sectional area of the actuator. Since it has been identified that adjustable force output can be a function of increased actuator diameter, using bundles or clusters of miniature McKibbons type actuators can scale upward in cross-sectional area through the addition of more actuators; since the individual actuator size does not increase, tolerances for pressure and stress remain the same while force output increases.

In a cylindrical pressure vessel, like a McKibbons Actuator, the effect of hoop stress from fluid pressure dominates the tensile stress in the individual fibers. It is established that $$T = \frac{PDd}{2\sin(\theta)} \quad (1)$$

where P, D, d, and θ are the fluid pressure, actuator tube inner diameter, fiber diameter, and weave angle respectively. As expected, the hoop stress, and therefore the tension, increase as a function of actuator diameter. The relationship for the peak contractile force (F) of a McKibbons style actuator can be expressed as:

$$F = \frac{\pi}{4} D_o^2 P \frac{1}{\sin^2(\theta)} (3\cos^2(\theta_0) - 1) \quad (2)$$

where θo and Do represent the weave angle and diameter of the actuator while at rest. For a given fiber, with diameter d and max tensile stress $\sigma_t$, and initial weave angle θo we can use Eqns. (1) and (2) to determine the maximum allowable fluid pressure as a function of diameter Do.

$$T_{max} = \frac{\pi}{4} \sigma_t d^2 \quad (3)$$

$$P_{max} = T_{max} \frac{\sin(\theta_o)}{2Dd} \quad (4)$$

Substituting $P_{max}$ into (2) allows for calculation of the peak contractile force $F_{max}$ as a function of diameter. Here, we consider the bundle of McKibbons actuator or BoMA approach where a single, large actuator can be replaced with multiple smaller actuators. By using smaller cylinders, a significantly higher fluid pressure can be used. Let t be the thickness of the actuator tube and fibers, so that the outer diameter of the actuator is D+t. Then, we can calculate the peak contractile stress as, $$\sigma_{max} = \frac{4F_{max}}{\pi(D+t)^2} \quad (5)$$

Using sample system parameters for θ, d, and t, and the tensile strength for high strength polyethylene, FIG. 7 shows the peak contraction stress over a range of possible tube diameters. Note the peak near D=0.6 cm, which illustrates that the tube diameter at which the greatest force density can be achieved. In a real system, cylinders can only be close packed to overall density of 78%, so there is a slight advantage to using a single McKibbons actuator. However, as seen in the figure, this 22% difference is small when compared with the improvement in force density from using multiple cylinders. When compared with a single actuator with a 4 cm diameter, the BoMA approach with multiple 0.6 cm diameter actuators more than doubles the potential force density.

Hydraulics also enables important advantages for replicating the principle of co-contraction in biarticulate, flexor/extensor muscle groups. Co-contraction has been shown to perform multiple functions in humans and animals, including a reduction of variability in reaching movements through increased stiffness produced by muscle activation and robustness to perturbations and an increase in joint impedance for greater limb stability, the quick generation of torque, and compensation for torque components orthogonal to desired trajectories.

In the BoMA approach, the stiffness inherent to the incompressible hydraulic fluid allows for precise control of a manipulator or leg through co-activation; for example, differences in simultaneous agonist (biceps brachii) contraction and antagonist (triceps brachii) contraction determine the position of the forearm. Isometric force can be determined by summing antagonist muscle torques; stiffness and torque can thus be controlled independently. This stiffness can be dynamically increased or decreased according to task requirements; greater stiffness allows for more precise control, while decreased stiffness enables more compliance. Additionally, the parallel elastic element in musculature acts as a lightly damped, non-linear spring which is the primary source for the passive tension (i.e., compliance) under eccentric loads which facilitates the contractile element's return to resting length. The elastic sheath of the fibers will provide some of this passive tension.

Hydraulics will inherently provide the remainder of damping using valves with adjustable orifices to produce a damping force proportional to the speed of movement. Since the biological tendon may contribute a great portion of compliance and therefore affect stiffness during locomotion, elasticity should be adjustable. Such stiffness will need to be counterbalanced with sufficiently high-bandwidth active and passive compliance to provide robustness to collisions and to maximize safety around humans. Thus, a key design characteristic of the BoMA approach is a range of compliance in both spring and damping characteristics. Approaches to compliance can be divided into two categories: passive and active. Passive approaches use the natural characteristics of materials to achieve spring and damping effects. Active compliance, on the other hand, is achieved by moving the actuator in a way that mimics a desired compliance.

Previously developed active approaches, such as the Series-Elastic Actuator use an actuator and tight control loop to mimic compliance of passive materials. In this approach, basic compliance is achieved through placement of spring between actuator and load; a linear potentiometer used to measure the spring's length provides force sensing that is combined with position sensors to facilitate rapid adjustments for desired position, velocity, springiness and damping gains. The series-elastic principle can be implemented using a hydraulic actuator that features low impedance and backdriveability; accordingly, the BoMA approach will be backdriveable.

For the BoMA approach, passive compliance is achieved through a number of means, including: the natural elasticity of the contractile sheath of the BoMA fibers, which provides a small restoring force back to resting length; through the elastic "tendons" arranged in series with the BoMA clusters, connecting them, with connectors at various locations (e.g., at the ends of the clusters), to the robot skeleton; through co-contraction control policies using adjustable stiffness; and through scalable actuation of individual fibers within clusters, exploiting the compliance of the surrounding unpressurized actuator material.

As noted above, FIG. 7 shows the peak contraction stress over a range of tube diameters, and the peak near D=0.6 centimeters. Accordingly, bundles of actuators (i.e., artificial muscle style actuator elements) having diameters of about that size should produce much better contraction stresses than like-styled single actuator elements having a much larger size. In illustrative embodiments, as noted above, a bundle of actuation elements can have a bundle force density that is at least two times greater than the force density of any single actuation element with a diameter of at least five times greater than any one of those in the bundle.

To that end, in one embodiment, all the actuators in the bundle have the same diameter to produce a bundle force density. The actuator diameter in this example can be assumed to be measured when actuated in some embodiments, and when not actuated in other embodiments. Compare this bundle to a single actuator having the same structure as those in the bundle, but with a diameter of at least five times greater than that of the actuators in the bundle. The force density of the bundle, in this embodiment, is at least twice the force density of the single actuator. For example, the force density of the bundle can be greater than two times that of the single actuator.

This phenomenon should happen in other embodiments even when the bundle has actuators with different individual diameters. For example, the bundle may have three actuators with 0.4 centimeter diameters, and three other otherwise identical actuators with 0.6 centimeter diameters. In that case, in some embodiments, the bundle force density still may be at least two times greater than that of the much larger single actuator. In fact, this phenomenon should still apply even if the single actuator has a diameter that is at least five times greater than that of any of the actuators in the bundle.

It should be noted that when used to describe an actuator when it is not actuated, the term "force density" can mean the potential force density the actuator is enabled to achieve when used. Indeed, the term "force density" also generally means the actual force density when the actuator is in use.

Illustrative embodiments preferably use hydraulic actuators in the bundle due to the uncompressible nature of the hydraulic fluid. For example, McKibbons style actuators may be used, but with hydraulic fluids rather than pneumatic fluids. This eliminates the need to compress a gas, which requires energy that undesirably may generate heat. Hydraulic actuators thus facilitate scaling of the bundle force density with the multiplicity of actuators. It also has been determined that smaller diameter actuators have better pressure-to-hoop-stress ratios than those of actuators with larger diameters. This improved ratio in part enables this arrangement.

With regard to FIG. 7, it is anticipated that actuator diameters near the peak of the curve should provide optimized force densities. For example, diameters of between about 0.4 centimeters to about 0.8 centimeters should deliver these improved results.

Accordingly, those skilled in the art can combine a plurality of small-diameter artificial muscle style hydraulic actuator elements into a bundle to deliver a force density that is at least double that of a single, much larger sized actuator. In addition to improved strength and agility, this design should reduce the bulk and weight of the overall device into which it is implemented (compared with those using larger actuators). This reduced weight thus further improves the use and appeal of the actuators with any of a variety of different devices, such as robots, body suits, automatic tourniquets, prosthetic attachments, dynamic guy wires, self-stiffening devices, etc. . . . .

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

We claim:

1. An actuator, comprising:
   a plurality of artificial muscle style hydraulic actuator elements, each artificial muscle style hydraulic actuator element having a first diameter between about 0.4 and about 0.8 centimeters, the plurality of artificial muscle style hydraulic actuator elements forming a bundle enabling a bundle force density;
   the bundle force density being at least about two times greater than the force density enabled by any single one of the artificial muscle style hydraulic elements if that single one artificial muscle style hydraulic actuator element had a second diameter, the second diameter being at least five times greater than the first diameter.

2. The actuator as defined by claim 1, wherein the artificial muscle style hydraulic actuator elements each are independently activated and controlled as needed to at least vary the power output of the bundle by selectively activating and controlling a desired number of elements.

* * * * *